United States Patent [19]
Tobita et al.

[11] Patent Number: 5,295,130
[45] Date of Patent: Mar. 15, 1994

[54] APPARATUS AND METHOD FOR SIGNAL REPRODUCTION

[75] Inventors: Minoru Tobita, Tokyo; Kunio Kawaguchi, Kanagawa, both of Japan

[73] Assignee: Sony Corporation, Tokyo, Japan

[21] Appl. No.: 803,645

[22] Filed: Dec. 4, 1991

[30] Foreign Application Priority Data

Dec. 17, 1990 [JP] Japan ................................. 2-411124

[51] Int. Cl.⁵ ............................................. G11B 20/10
[52] U.S. Cl. ......................................................... 369/124
[58] Field of Search ............................................ 369/124

[56] References Cited

U.S. PATENT DOCUMENTS 4,905,109  2/1990  Bartlett et al. ..................... 366/77.02

FOREIGN PATENT DOCUMENTS

| 0360674A2 | 3/1990  | European Pat. Off. ...... G06F 15/80 |
| 0400899A2 | 12/1990 | European Pat. Off. ...... G11B 20/10 |
| 0449516A2 | 10/1991 | European Pat. Off. ...... G06F 15/80 |
| 0450522A2 | 10/1991 | European Pat. Off. ...... G06F 15/80 |

*Primary Examiner*—Jack I. Berman
*Attorney, Agent, or Firm*—Philip M. Shaw, Jr.

[57] ABSTRACT

An apparatus and method for reproducing pit information precisely from a magnetic optical disk without being adversely affected by heat accumulation. The signal reproducing apparatus reproduces signals using a neural network constituting a decoder that decodes pits on the disk. The signal reproducing method provides learning using a sigmoid function and carries out signal reproduction using a step function.

6 Claims, 14 Drawing Sheets d = 0.60(μ)  p = 8.1(mW)

d = 0.56(μ)  p = 8.1(mW)  [LEARNING PERFORMED WITH d = 0.60(μ) p = 8.1(mW)]

APPARATUS AND METHOD FOR SIGNAL REPRODUCTION

BACKGROUND OF THE INVENTION

1. Field of the Invention

The present invention relates to an apparatus and method for reproducing signals from a magnetic optical disk.

2. Description of the Prior Art

Today, magnetic optical disks are coming into general use as a secondary mass storage for use with personal computers, workstations and the like. Signals are recorded on the magnetic optical disk as follows: In an appropriately biased magnetic field, a laser beam is applied to the magnetic optical film on the disk surface. The laser beam heats up the film where required to reverse polarity, forming pits that represent signals. The magnetic optical disk thus contains recordings at higher density than the conventional optical disk whose pits are physically formed depressions (or projections). In this respect, the magnetic optical disk is suitable for use as a mass storage.

FIG. 19 shows a typical relationship between pits recorded on the magnetic optical disk on the one hand, and a reproduced RF signal obtained by irradiating a laser beam to these pits on the other. As shown in FIG. 19, when the recording density is increased, one optical spot formed by the laser beam tends to irradiate two pits or more. As a result, higher recording densities leave the reproduced RF signal more likely to be affected by adjacent pits.

One solution to the above problem is to equalize the reproduced RF signal using a digital filter, as depicted in FIG. 20. In the example of FIG. 20, the input RF signal is delayed successively by "n" delay circuits 11 through 1n. The signals output by the delay circuits 11 through 1n enter "n" multipliers 21 through 2n which correspond to the respective delay circuits. After multiplication, the multipliers produce coefficients w1 through wn. The outputs of the multipliers 21 through 2n enter an adder 3 for addition. Coefficients w1 through wn from the multipliers 21 through 2n are then adjusted to a predetermined value. In this manner, the outputs of the RF signal from the adder 3 are equalized for a predetermined characteristic.

As signals are recorded over time on the magnetic optical disk, the pits recorded later tend to be larger than those recorded earlier due to such effects as heat response and accumulation, as illustrated in FIGS. 21 and 22. When the pits are read for reproduction, the larger pits proportionately raise the level of the RF signal. This means that the waveform of the reproduced RF signal no longer stays linear. In that case, equalizing the reproduced RF signal with the digital linear filter of FIG. 20 is not enough to obtain information accurately corresponding to the individual pits. Although it is conceivable to vary the coefficients "w" in accordance with the data (pit) pattern, this gives rise to a possibility of error propagation. Furthermore, attempts to vary the coefficients "s" in units of pits are unrealistic from a practical point of view.

SUMMARY OF THE INVENTION

It is therefore an object of the present invention to provide an apparatus and method for accurately reading information represented by pits of nonlinearly deformed RF signals.

In carrying out the invention and according to a first aspect thereof, there is provided a signal reproducing apparatus for reproducing signals from a recording medium, the apparatus comprising: analog-to-digital converting means for converting from analog to digital format the signals reproduced from the recording, medium; and decoding means made of a neural network having, learned coefficients beforehand for decoding signals output by the analog-to-digital converting means.

According to a second aspect of the invention, there is provided a signal reproducing method for reproducing signals from a recording medium, comprising the steps of: having a neural network learn predetermined coefficients by use of a sigmoid function; and decoding the signals reproduced from the recording medium by use of a step function through the neural network.

With the signal reproducing apparatus according to the first aspect of the invention, signals reproduced from the recording, medium are converted from analog to digital format. The digital signals are then decoded by the decoding means constituted by the neural network that has learned predetermined coefficients in advance. This arrangement makes it possible to decoded signals precisely from the recording medium.

Under the signal reproducing method according to the second aspect of the invention, the sigmoid function is used to have the neural network learn appropriate coefficients. When signals are actually reproduced from the recording, medium, the step function is utilized. This scheme simplifies the hardware construction involved.

Further objects, features and advantages of the invention will become more apparent upon a reading of the following description and appended drawings.

DESCRIPTION OF THE PREFERRED EMBODIMENT

Figure 2:
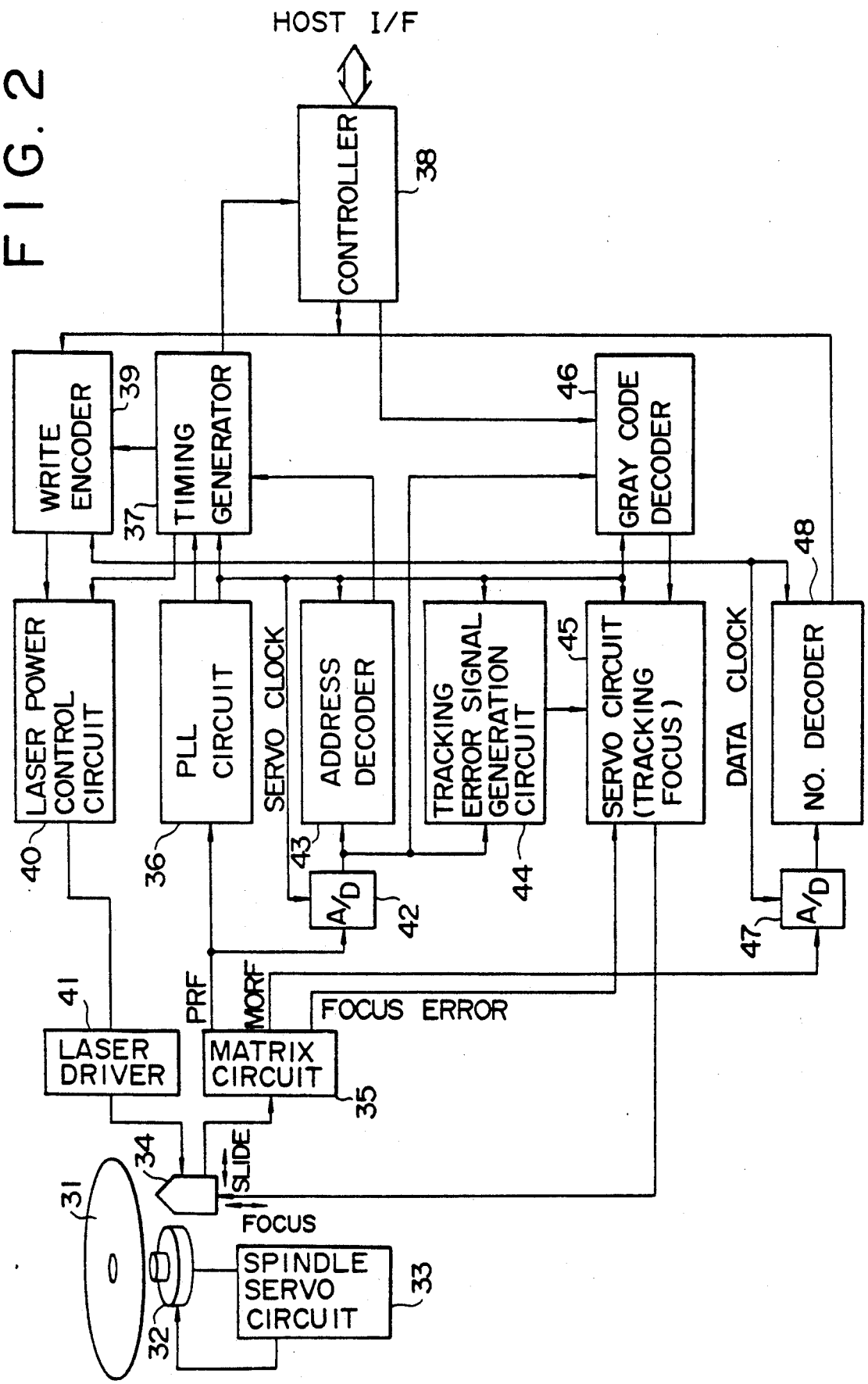
FIG. 2 is a block diagram of a signal reproducing apparatus embodying the invention.

FIG. 2 is a block diagram of a magnetic optical disk drive unit embodying the present invention. In FIG. 2, a magnetic optical disk 31 is rotated by a spindle motor 32. The spindle motor 32 is controlled in rotation by a spindle servo circuit 33. A head 34 applies an appropriately biased magnetic field to the magnetic optical disk 31 and irradiates a laser beam thereto for recording and reproducing signals. For recording, a recording signal is input to a controller 38 through a host computer interface, not shown. The controller 38 supplies the recording signal to a write encoder 39. The write encoder 39 encodes the signal it receives and outputs the encoded signal to a laser power control circuit 40. The laser power control circuit 40 controls a laser driver 41 to adjust laser beam intensity in response to the signal to be recorded. Thus the laser driver 41 adjusts the intensity of the laser beam irradiated from the head 34 to the magnetic optical disk 31, whereby the signal is recorded onto the disk 31.

A reproduced RF signal output by the head 34 is output to a matrix circuit 35. The matrix circuit 35 separates the signal received from the head 34 into a sum signal (PRF) and a difference signal (MORF). The magnetic optical disk 31 contains a plurality of sectors, each sector comprising a plurality of segments. Each segment is constituted by a servo byte storage area and a data storage area. The servo byte data comprise track location data and/or tracking data. These data are represented by physical irregularities, i.e., depressed or projected pits on the disk surface. The sum signal is a signal that corresponds to the bits, while the data area signal is a signal that corresponds to a signal recorded on the magnetic optical film.

A PLL circuit 36 generates a data clock signal and a servo clock signal out of the sum signal coming from the matrix circuit 35. The data clock signal is supplied to the write encoder 39, a timing generator 37, an A/D converter 47 and a decoder 48. The servo clock signal is fed to an A/D converter 42, an address decoder 43, a tracking error signal generation circuit 44, a servo circuit 45 and a gray code decoder 46. The A/D converter 42 converts from analog to digital format the sum signal coming from the matrix circuit 35. The resulting digital signal is output to the address decoder 43, tracking error signal generation circuit 44 and gray code decoder 46. The address decoder 43 detects the track location of the head 34 by use of the output from the A/D converter 42, and supplies the timing generator 37 with a signal corresponding to that track location. The timing generator 37 generates various timing signals in response to the signals from the address decoder 43 and PLL circuit 36. These timing signals are output to the controller 38, write encoder 39 and laser power control circuit 40.

The tracking error signal generation circuit 44 extracts the so-called warble pit component from the output of the A/D converter 42, and generates a tracking error signal accordingly. The tracking error signal is output to the servo circuit 45. The servo circuit 45 controls the tracking state and focusing state of the head 34 in response to the tracking error signal from the tracking error signal generation circuit 44 and a focus error signal from the matrix circuit 35. The gray code decoder 46 detects gray codes in the servo byte from the output of the A/D converter 42. The detected signal is sent by the gray code decoder 46 to the servo circuit 45. The gray code decoder 46 receives from the controller 38 a command that contains a reference speed at seek time and object track information. The difference signal output by the matrix circuit 35 is converted from analog to digital format by the A/D converter 47. The digital signal after conversion is input to the decoder 48. The decoder 48 decodes the signal received from the A/D converter 47, and outputs the decoded result to the host computer via the controller 38.

Figure 3:
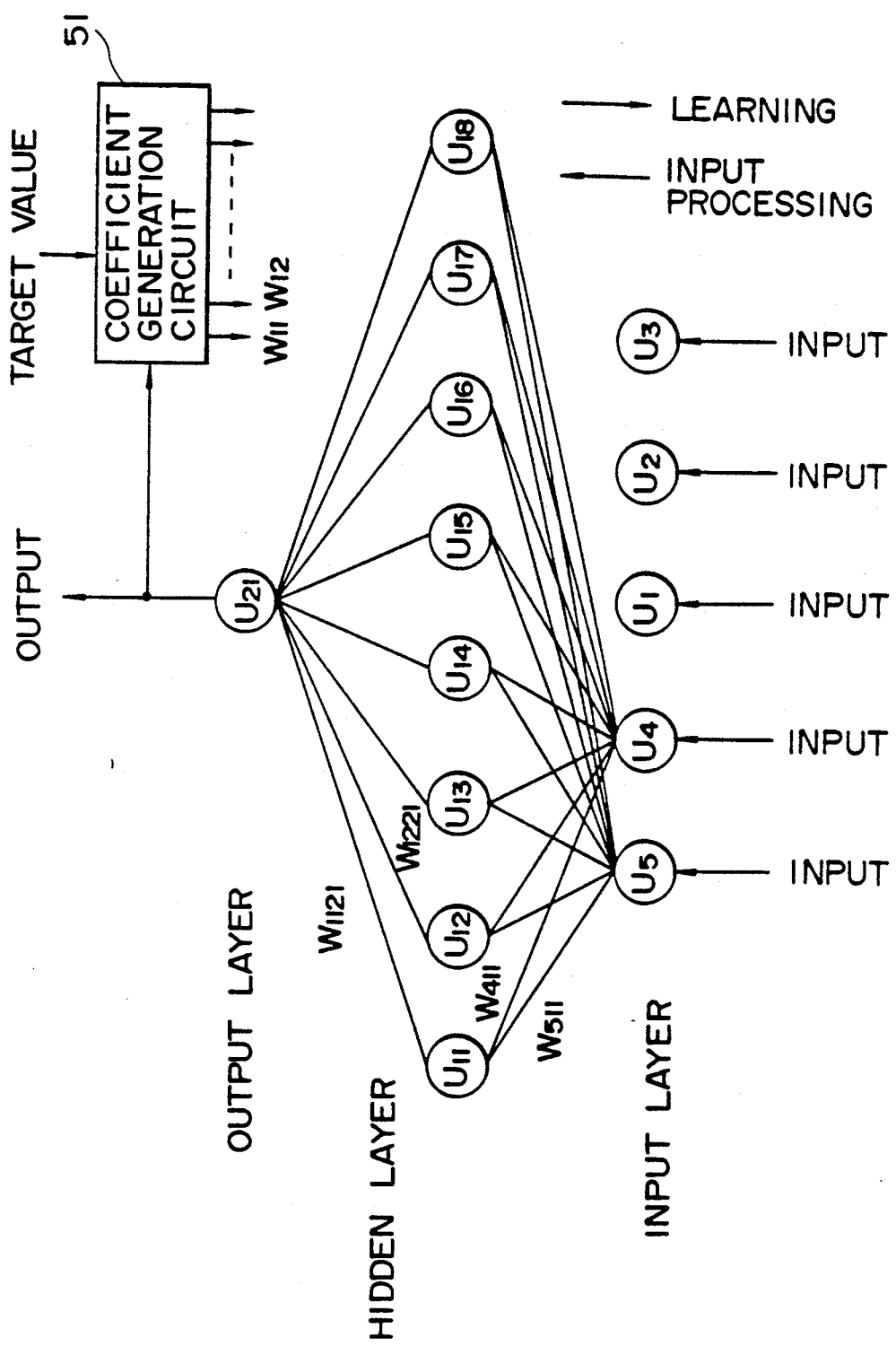
FIG. 3 is a view depicting the construction of a typical neural network constituting the decoder in FIG. 2.

The decoder 48 comprises a neural network depicted in FIG. 3. With this embodiment, five units u1 through u5 compose an input layer, eight units u11 through u18 form a hidden layer, and one unit u21 constitutes an output layer. The units u1 through u5 are each connected to the units u11 through u18, and the units u11 through u18 are all connected to the unit u21. Each line connecting two units has a predetermined coefficient wij ("i" and "j" representing the units connected) assigned thereto. The coefficient wij between units is determined by a coefficient generation circuit 51. It is to be noted that in FIG. 3, only part of the lines connecting the units are shown for illustrative simplicity.

The number of input layer units is so determined as to accommodate a signal ranging from a desired target bit to the pits which affect that target bit. The number of output layers "m" is made to correspond with the number of desired target pits for a single input pass. The total number of hidden layers and the number of units in each layer are determined so as to permit learning. For example, where a pit which is "n" clock pulses away from a target pit affects that target pit, the number of input layers is $2n + m$. With the arrangement of FIG. 3, $m = 1$ and $n = 2$. That is, one target pit is considered to be affected by two pits preceding it and by another two subsequent thereto. In order to acquire better results in terms of offset and amplitude, a predetermined number ($\alpha$) of units may be added to the input layer so that the necessary information may be obtained from an isolated pit (i.e., reference).

Figure 21:
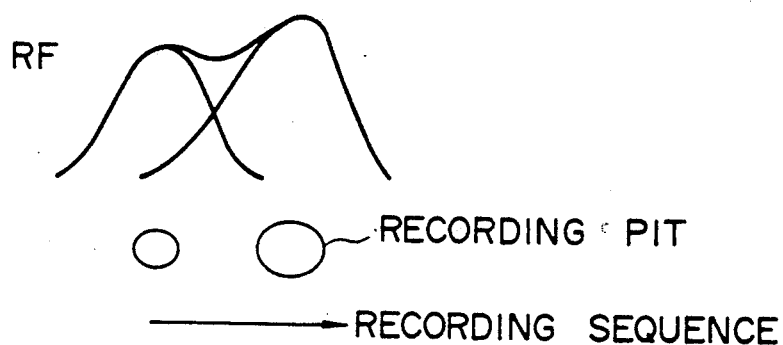
FIG. 21 is a view showing waveforms of a reproduced RF signal with respect to a recording pit configuration.
Figure 22:
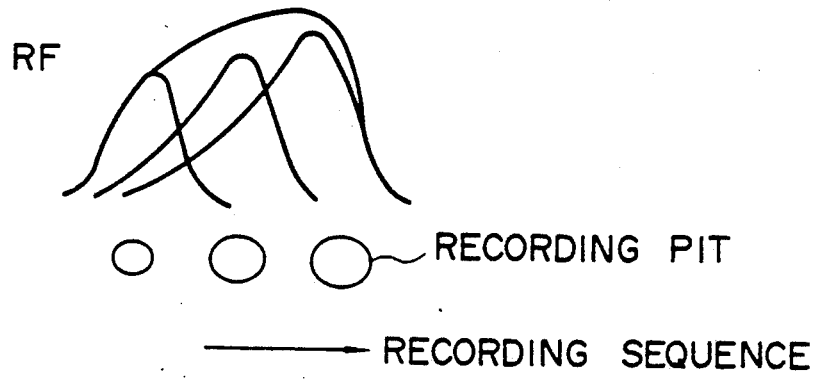
FIG. 22 is a view depicting waveforms of the reproduced RF signal with respect to another recording pit configuration.

The above-described neural network is made to learn appropriate coefficients as follows. A magnetic optical disk containing suitable pits is prepared first, and the recordings of the disk are reproduced. As illustrated in FIGS. 21 and 22, the pits on the disk surface are irregular. The signal reproduced from the magnetic optical disk is converted from analog to digital format. The digital signal after conversion is input to the units u1 through u5 in the input layer. The data items input to the units u1 through u5 are each multiplied by a coefficient corresponding to each connecting line. The data after multiplication are fed to the units u11 through u18 in the hidden layer. The units u11 through u18 add the received data to the data coming from the units u1 through u5. Then the units u11 through u15 output the data to the unit u21 after multiplication by the coefficients keyed to the respective connecting lines. The unit 21 in the output layer adds up the data items received from the hidden layer units for output.

Assume that the data item entered into the unit u1 is the data to be read and decoded. In this case, the data coming form the units u2 and u3 are the data corresponding to two bits preceding the target pit keyed to the data from the unit u1, and the data from the units u4 and u5 are the data corresponding to two bits subsequent to the same target pit. The data item coming from the unit u21 in the output layer should normally match that from the unit u1 in the input layer, but now contains error after being affected by the data coming from the units u2 through u5 corresponding to the pits preceding and following the target pit. The data item output by the unit u21 enters the coefficient generation circuit 51. The user inputs to the coefficient generation circuit b1 a target value that should have been normally output by the unit u21. That is, what the user supplies to the coefficient generation circuit 51 is the data that should normally be supplied by the unit u1 thereto. The coefficient generation circuit 51 computes the difference between the output of the unit u21 and the target value, and generates coefficients so that that difference will be minimized.

Figure 4A:
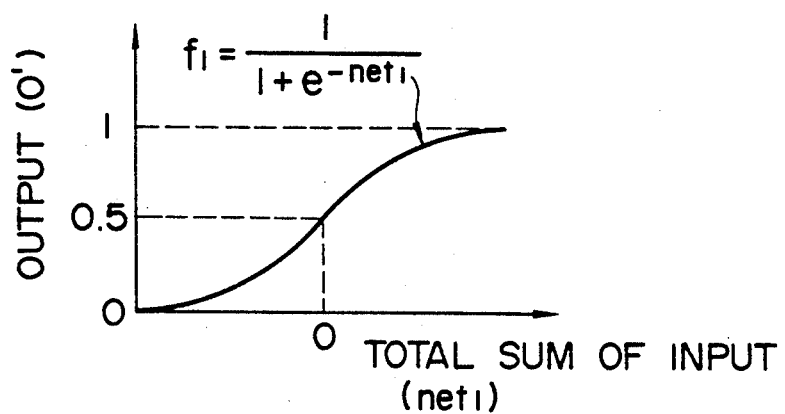
FIGS. 4(a) and (b) are a set of views showing input/output characteristics of units constituting the neural network of FIG. 3.
Figure 4B:
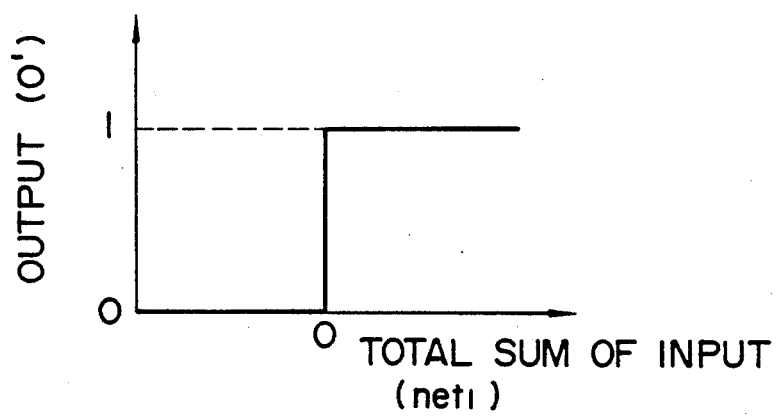

The coefficients between the hidden layer and output layer units are first determined so that the discrepancy between the output and the target value will be minimized. Once these coefficients are established, the coefficients between the input layer and hidden layer units are determined so that the discrepancy between the output and the target value will also be minimized. What takes place is a process of learning in back propagation, i.e., reversing of the order of input processing. When all coefficients have been determined, another batch of data is input from the input layer. Again the coefficients are set so that the difference between the currently obtained output and the target value will be minimized, and the process is repeated. Because appropriate coefficients are determined through the above learning process, the unit u21 starts yielding an output that matches the data entered from the input layer unit u1 even if the data from the unit u1 were affected by the data from the units u2 through u5. The units u11 through u18 in the hidden layer and the unit u21 in the output layer have input/output characteristics corresponding to a sigmoid function depicted in FIG. 4 (A). According to this function, a value between 0 and 0.5 is output when the input sum (net 1) is negative, and a value between 0.5 and 1 is output when the input sum is positive.

Figure 1:
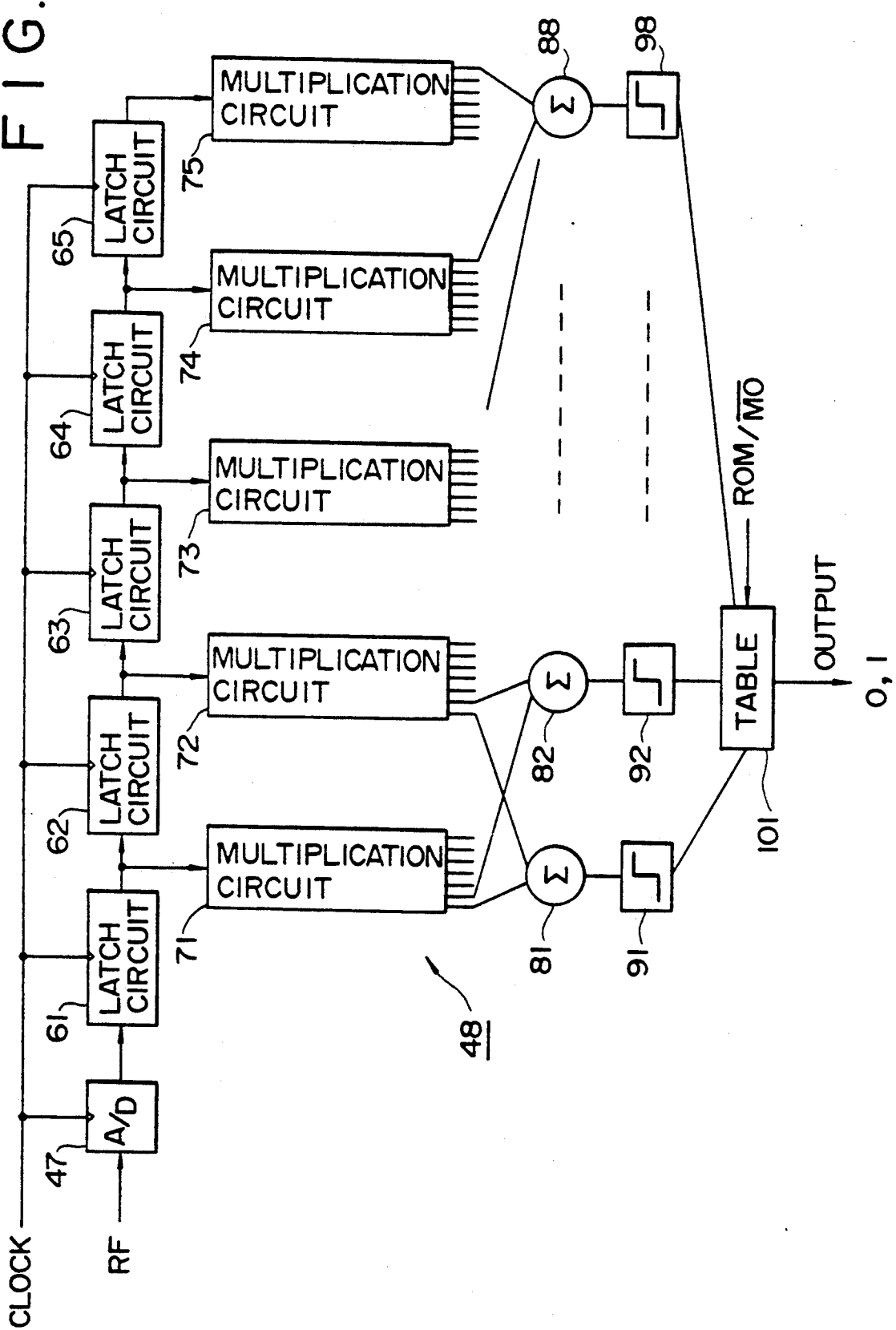
FIG. 1 is a block diagram of a circuit arrangement embodying the decoder included in FIG. 2.

FIG. 1 shows a typical hardware implementation of the neural network (i.e., decoder 48) shown in FIG. 3. As shown in FIG. 1, the neural network comprises latch circuits 61 through 65 corresponding to the units u1 through u5 in the input layer. Also included in the network are multiplication circuits 71 through 75, adders 81 through 88 and step function circuits 91 through 98, all corresponding to the units u11 through u18 in the hidden layer. The neural network further contains a table 101 that corresponds to the unit u21 in the output layer.

Figure 5:
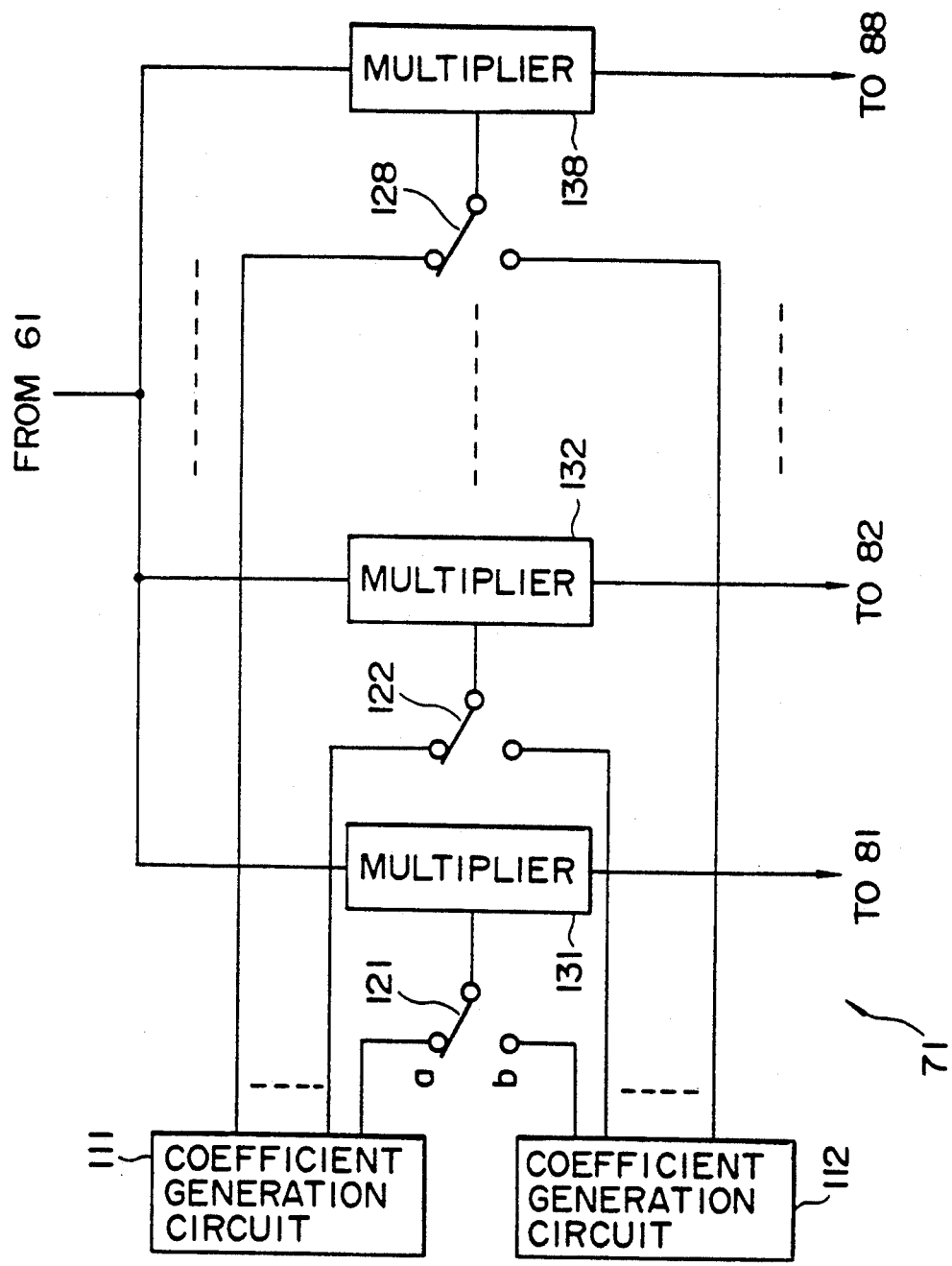
FIG. 5 is a block diagram of a typical circuit arrangement embodying one of the multiplication circuits in FIG. 1.

The multiplication circuit 71 (identical in structure to circuits 72 through 75) is typically constructed as shown in FIG. 5. As seen in FIG. 5, the multiplication circuit 71 comprises eight multipliers 131 through 138, two coefficient veneration circuits 111 and 112, and switches 121 through 128 for supplying the multipliers 131 through 138 with the coefficients generated by the circuits 111 and 112.

The coefficient generation circuit 111 contains coefficients which, as discussed with reference to FIG. 3, are set beforehand so as to permit proper decoding even if the pit size is varied by heat accumulation and other factors. Where the magnetic optical disk is used not as a RAM disk to and from which to write and read data but as a ROM disk for reading (i.e., reproduction) only, the adverse effects mentioned above do not apply. This means that the magnetic optical disk, when used as a ROM disk, requires the coefficients between the units to be different from those for the RAM disk. The coefficient generation circuit 112 contains coefficients appropriate for reading data from the ROM disk. These coefficients are also stored as a result of the above-described learning process.

Below is a description of how the circuits of FIGS. 1 and 5 work. The A/D converter 47 converts data from analog to digital format. The digital data after conversion is delayed successively by one clock pulse before being supplied to the latch circuit 61 through 65. The data items latched by the latch circuits 61 through 65 are fed to the multiplication circuits 71 through 75, respectively. In the multiplication circuits 71 through 75, the switches 121 through 128 are set to the contact "a" side for RAM dish reproduction, or to the contact "b" side for ROM disk reproduction. Thus the multipliers 131 through 138 are supplied with the coefficients generated by the coefficient generation circuit 111 for RAM disk reproduction, or with the coefficients generated by the coefficient generation circuit 112 for ROM disk reproduction. The coefficients stored in the coefficient generation circuits Ill and 112 correspond to the coefficients between the input and hidden layers in FIG. 3.

The multipliers 131 through 138 receive the coefficients from the coefficient generation circuit 111 or 112, and multiply the data from the latch circuit 61 (or any of 62 through 65) by the received coefficients. The results are output to the adders 81 through 88. In turn, the adders 81 through 88 add up the data coming from the multiplication circuits 71 through 75, the added data being sent to the step function circuits 91 through 98. The step function circuits 91 through 98 have the step function input/output characteristic illustrated in FIG. 4 (B). The output of the circuits is "0" when the input sum is negative; the output is "1" when the input sum is positive. As described with reference to FIG. 3, the neural network performs its learning using the sigmoid function shown in FIG. 4 (A). However, the step function is employed in a block where reading actually takes place. Whereas the hardware for implementing the sigmoid function is very complex in construction, the hardware that uses the step function is structurally simple. The outputs of the step function circuits 91 through 98 correspond respectively to those of the units u11 through u18 in the hidden layer of FIG. 3. The outputs of the step function circuits 91 through 98 are input to the table 101. This means that in practical terms, the table 101 contains the coefficients between the hidden and output layers in FIG. 3. With this embodiment, however, the step function is used instead of the sigmoid function as discussed. Thus the table 101 receives "1" or "0" data from the step function circuits 91 through 98 if the output from the units u11 through u18 in the hidden layer is either "1" or "0," the data entering the unit u21 in the output layer is either the same value as the coefficient or "0." It follows that, if the step function is also used here, the output of the unit u21 in the output layer is "0" when the value augmented by the coefficient from the hidden layer or by "0" is negative, or is "1" when the value so augmented is positive. In other words, once the outputs of the units u11 through u18 in the hidden layer are determined, the data coming out of the unit u21 in the output layer is also determined.

With this embodiment, the table 101 contains beforehand the data to be output from the output layer, the contained data corresponding to the data entered from the step function circuits 91 through 98. The data entered from the step function circuits 91 through 98 is taken as an address, and the data corresponding to that address is read and output. As in the case of the coefficient generation circuits 111 and 112 in FIG. 5, the data contained in the table 101 may also come in two kinds: one for RAM use and the other for ROM use.

Figure 6:
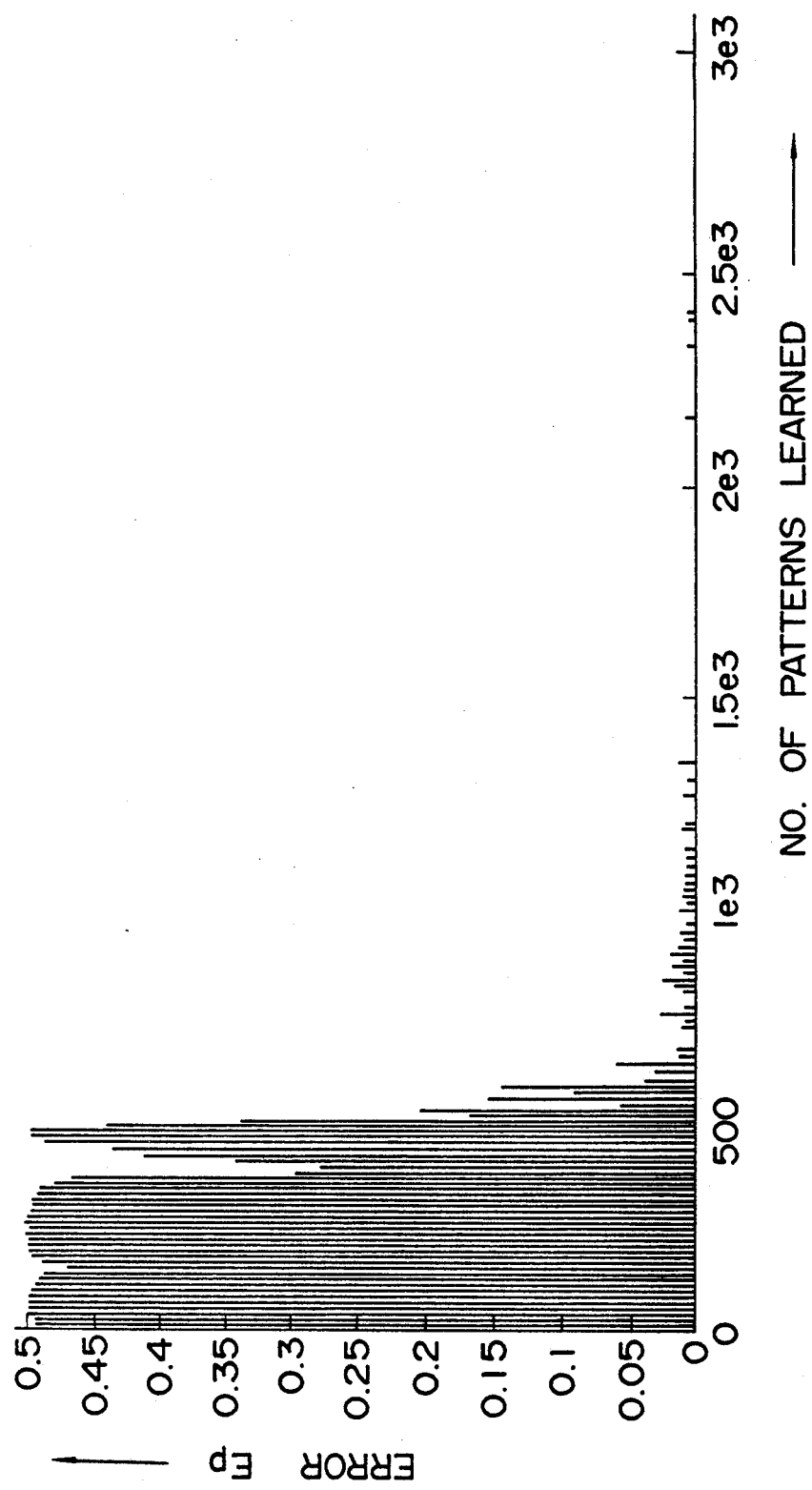
FIG. 6 is a learning curve view representing a case in which errors converge.
Figure 7:
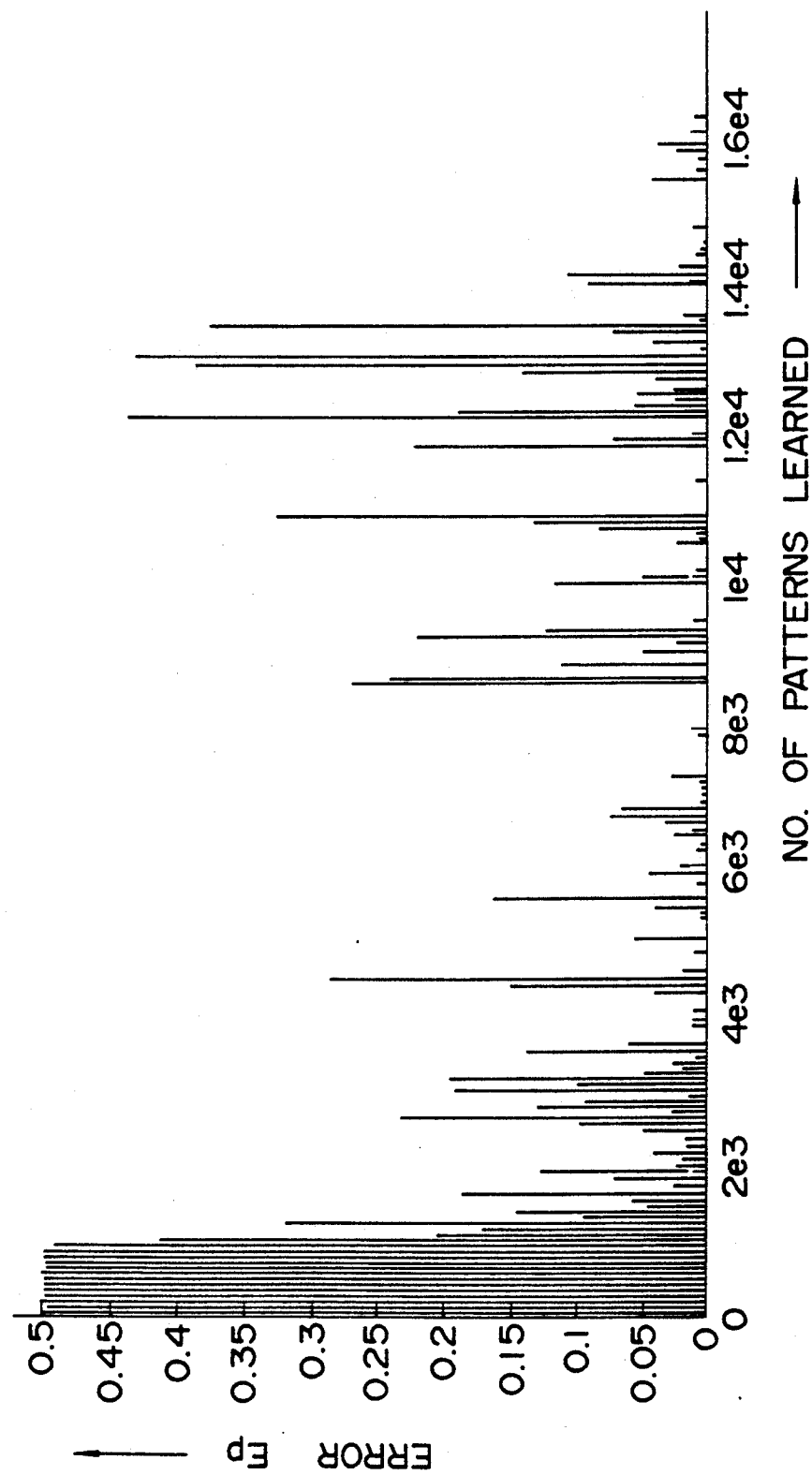
FIG. 7 is a learning curve view representing a case in which errors fail to converge.
Figure 8:
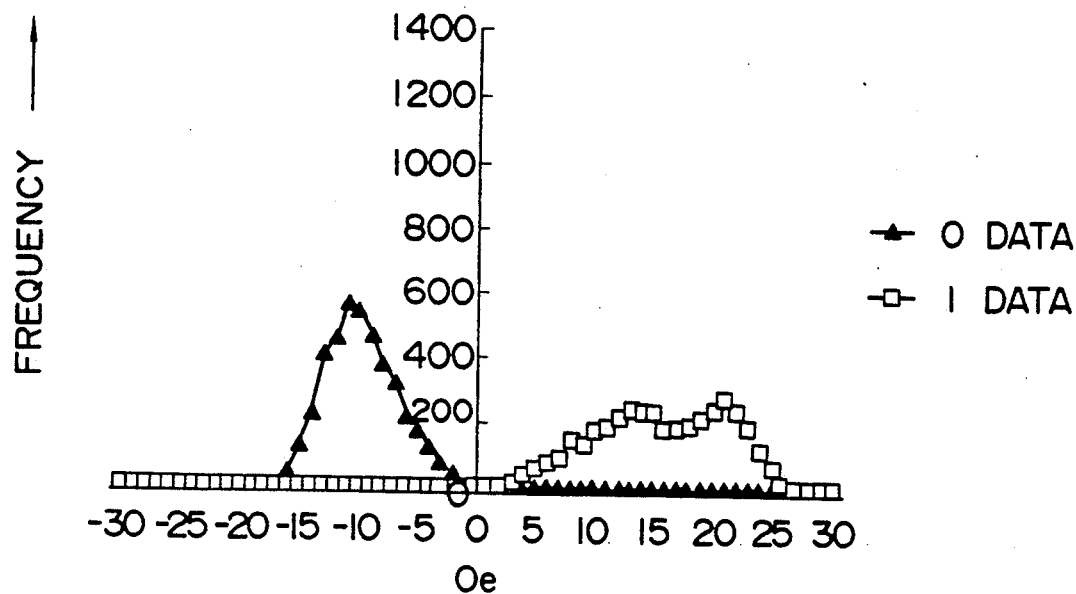
FIGS. 8 through 18 are views plotting measurements taken during experiments conducted in connection with the invention.
Figure 9:
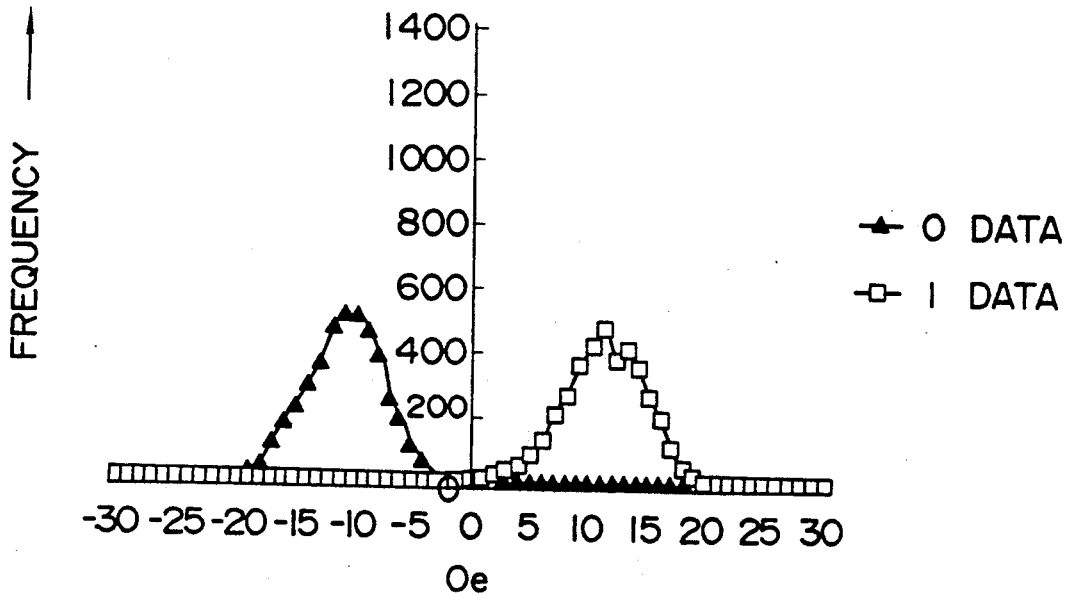
Figure 10:
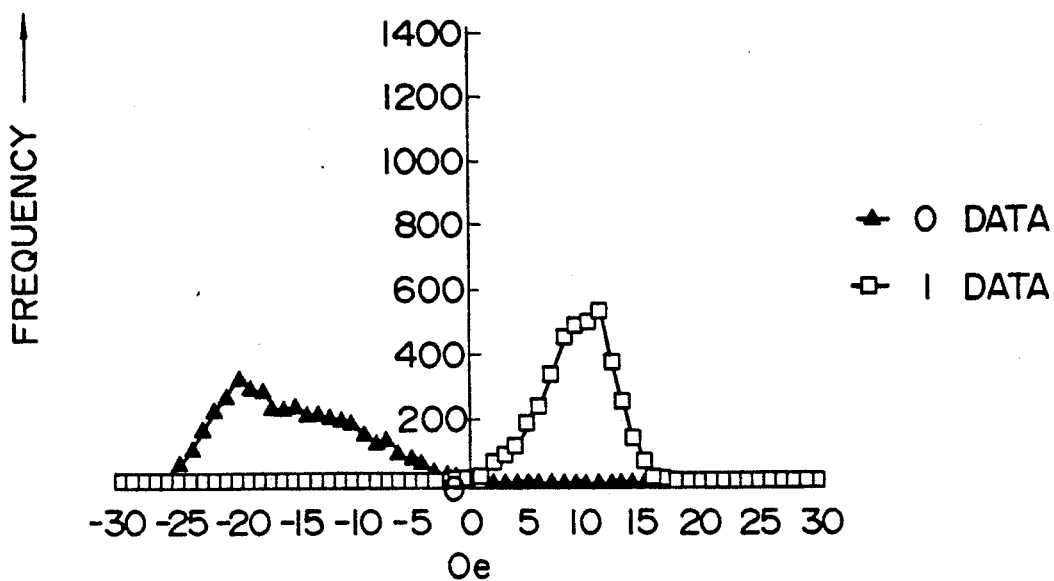
Figure 11:
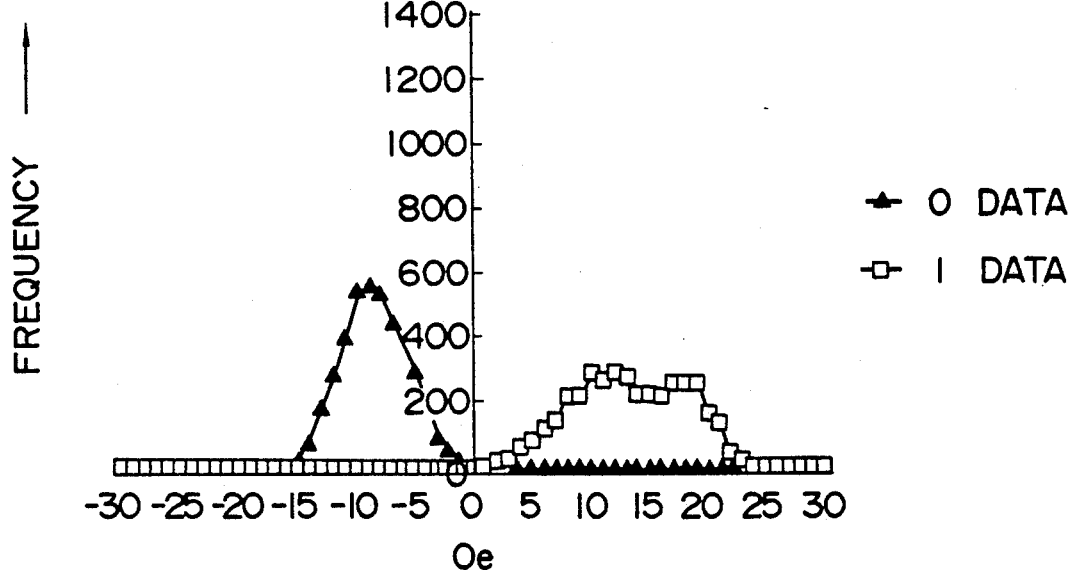
Figure 12:
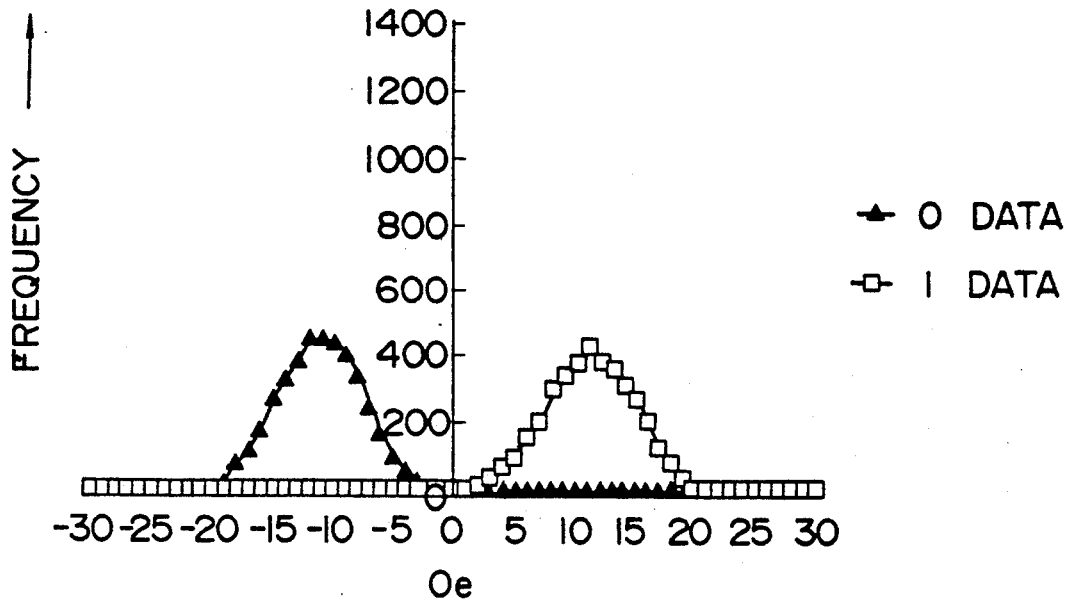
Figure 13:
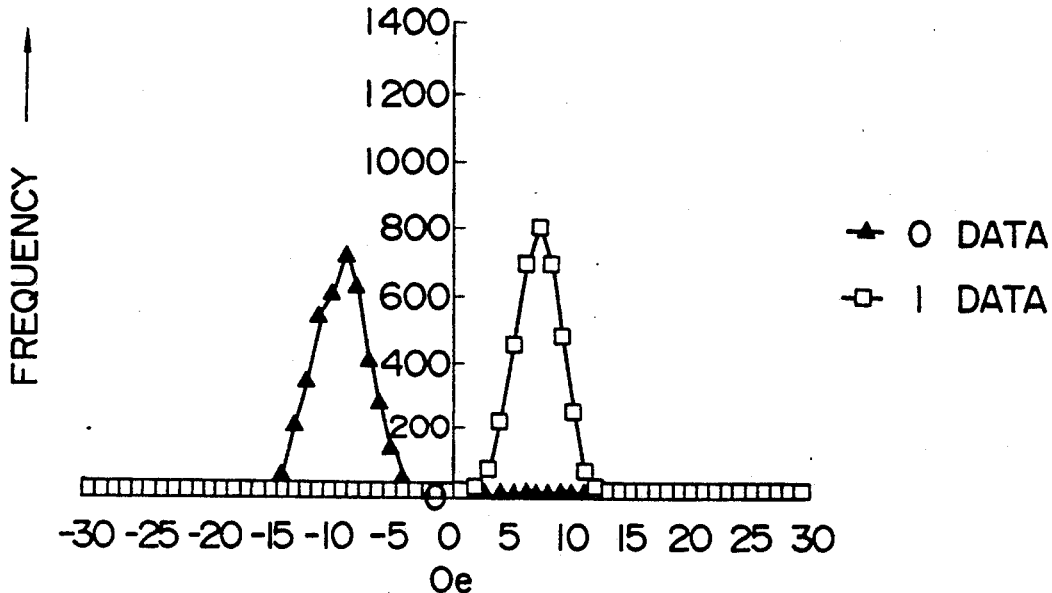
Figure 14:
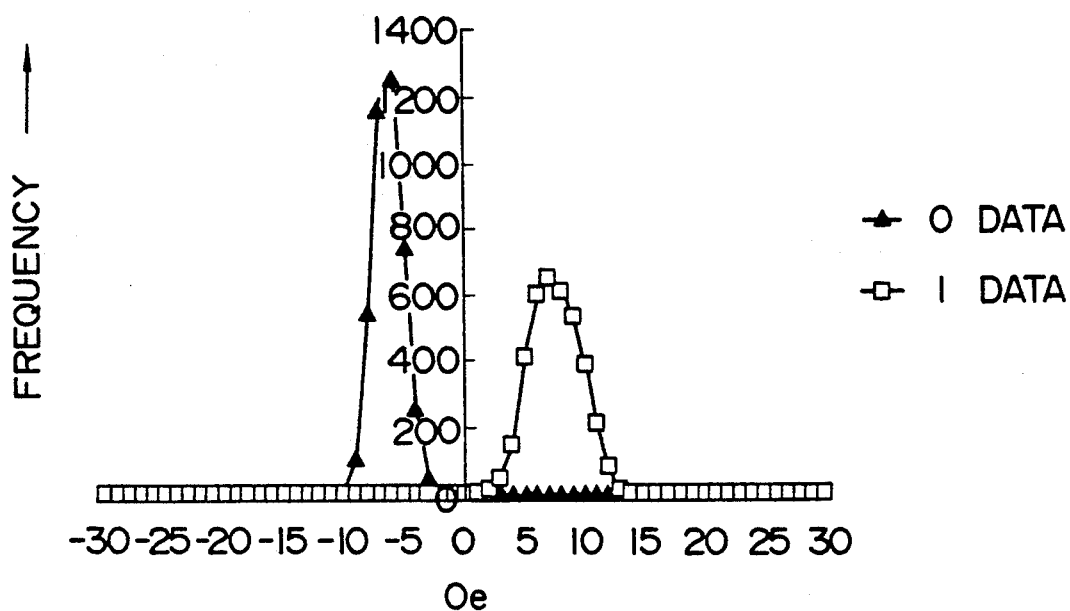
Figure 15:
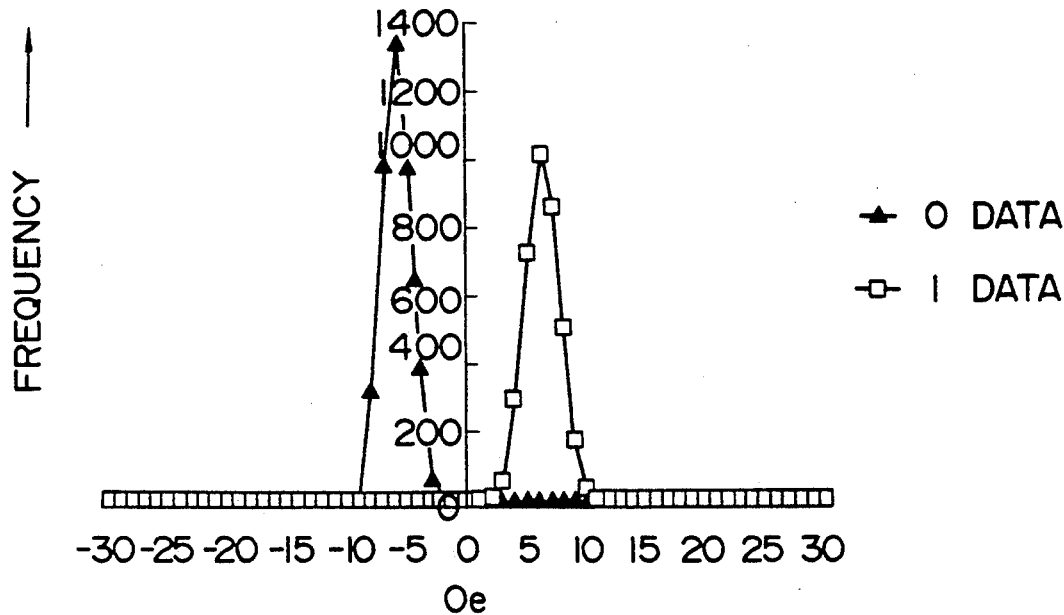
Figure 16:
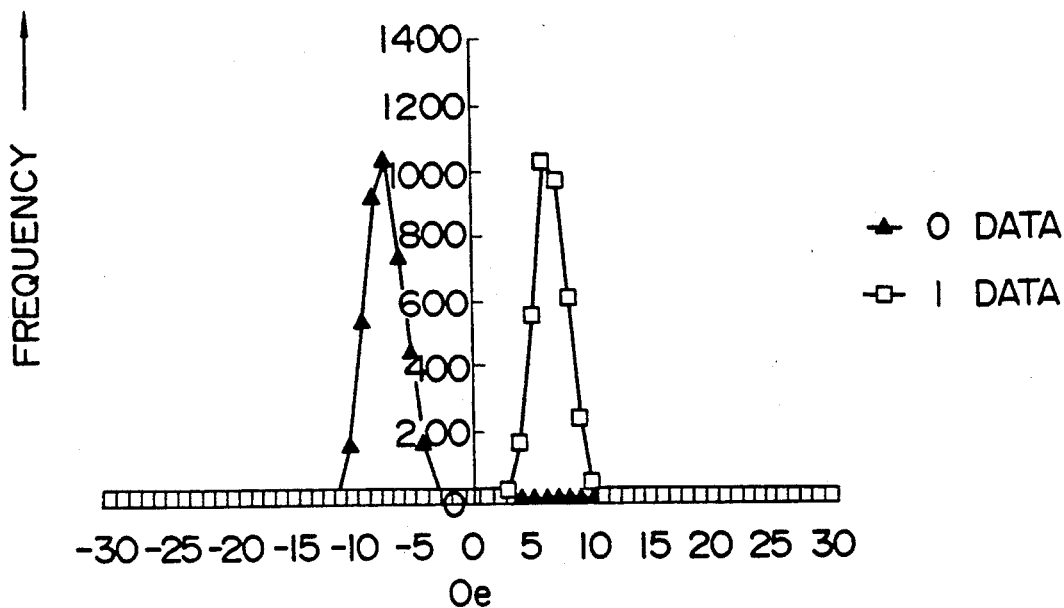

Experiments conducted regarding the learning process will now be described. FIG. 6 is a learning curve view indicating a learning count (number of patterns learned) on the abscissa versus the errors involved on the ordinate. As evident from FIG. 6, the errors decrease and tend to converge following sufficient learning. In the example of FIG. 6, the recording density (distance between the centers of the nearest two pits) "d" is 0.60 (μm/pit), and the laser power "p" is 8.1 (mw). If the recording density "d" is set to 0.52 (μm/pit) and the laser power to 7.3 (mw), the learning curve turns out to be as shown in FIG. 7. Clearly, the example of FIG. 7 leaves the errors unconverged and thus fails to provide effective learning.

| Laser power | Recording density (μm/pit) | | |
|---|---|---|---|
| p (mw) | 0.52 | 0.56 | 0.60 |
| 6.5 | X | X | ⊚ |
| 7.3 | X | X | ⊚ |
| 8.1 | X | ○ | ⊚ |

⊚: Complete converged
○:Sufficiently converged
X: Not converged

Table 1 shows how the errors involved converge as the recording density "d" and the laser power "p" are varied. As indicated, the errors completely converge when the recording density "d" is set to 0.60 (μm/pit) or more but fail to converge if the density is less.

The sigmoid function (step function) is a monotone increasing function that serves to set the output of each unit either to "0" or to "1". Thus the neural network is properly evaluated not by using the output of the output unit, but by employing a sum Oe of weighted inputs from the hidden layer units before the sigmoid function (step function) for the output unit is activated. FIGS. 8 through 16 depict frequency distributions of the values Oe as they occur when the number of samples for evaluation data is about 8,000; the "0" data count is about the same as the "1" data count; the recording density "d" is changed from 0.52 to 0.56 to 0.60 (μm/pit); and the laser power "p" is changed from 6.5 to 7.3 to 8.1 (mw). In these figures, each solid triangle mark stands for a "0" and each hollow rectangle mark for a "1".

| Recording density (μm/pit) | Laser power P (mw) | Mean M | Standard deviation σ | \|m/σ\| |
|---|---|---|---|---|
| 0.52 | 6.5 | −9.56 | 3.35 | 2.85 |
| | | 15.51 | 5.55 | 2.79 |
| | 7.3 | −10.76 | 3.28 | 3.28 |
| | | 11.16 | 3.38 | 3.30 |
| | 8.1 | −15.27 | 5.81 | 2.63 |
| | | 9.11 | 3.01 | 3.03 |
| 0.56 | 6.5 | −8.40 | 2.84 | 2.96 |
| | | 13.20 | 4.69 | 2.83 |

-continued

| Recording density (μm/pit) | Laser power P (mw) | Mean M | Standard deviation σ | \|m/σ\| |
|---|---|---|---|---|
| | 7.3 | 11.05 | 3.44 | 3.21 |
| | | −11.21 | 3.49 | 3.21 |
| | 8.1 | −9.20 | 2.30 | 4.00 |
| | | 7.01 | 1.78 | 3.94 |
| 0.60 | 6.5 | −6.30 | 1.22 | 5.16 |
| | | 7.55 | 2.02 | 3.74 |
| | 7.3 | −5.92 | 1.16 | 5.10 |
| | | 6.28 | 1.37 | 4.58 |
| | 8.1 | −7.05 | 1.55 | 4.55 |
| | | 6.59 | 1.31 | 5.03 |

Table 2 illustratively lists mean values "m" and standard deviations "σ" computed when the distribution is assumed to be normal. In Table 2, the upper-tier values correspond to "0" data and the lower-tier values to "1" data. In this case, too, it can be seen that when the recording density "d" is 0.60 μm/pit or higher, the ratio of mean value "m" to standard deviation "σ" becomes sufficiently high to separate "1" from "0" with ease.

Figure 17:
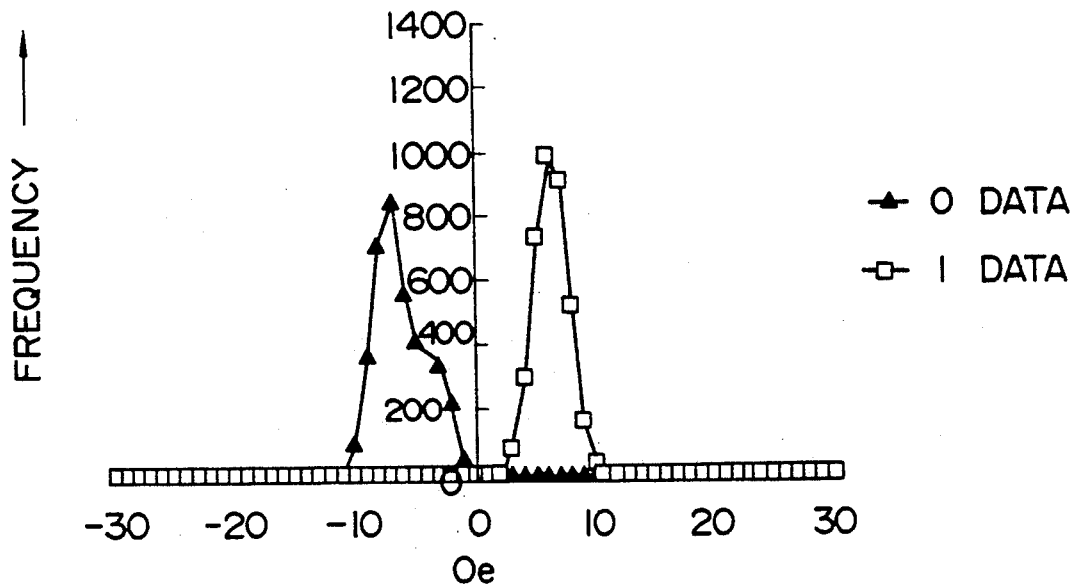
Figure 18:
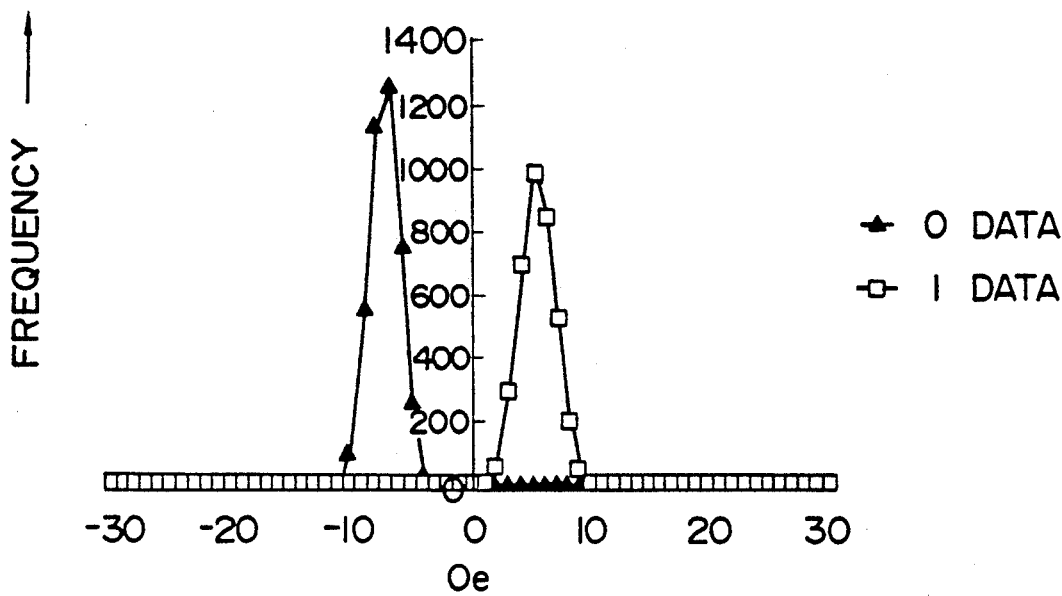
Figure 19:
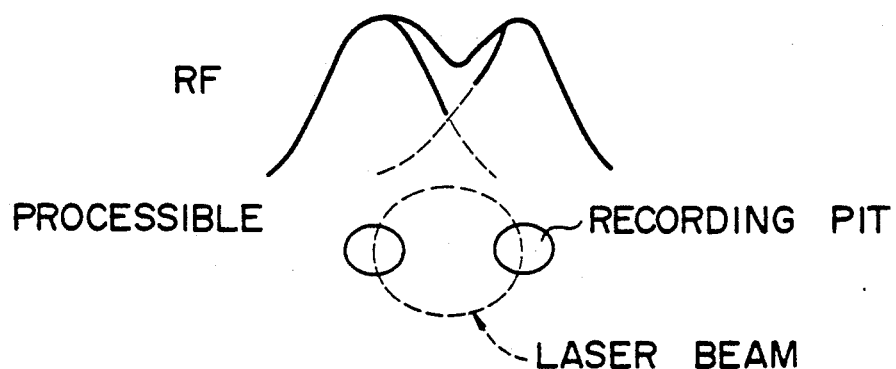
FIG. 19 is a view illustrating waveforms of a reproduced signal with respect to a recording pit configuration.
Figure 20:
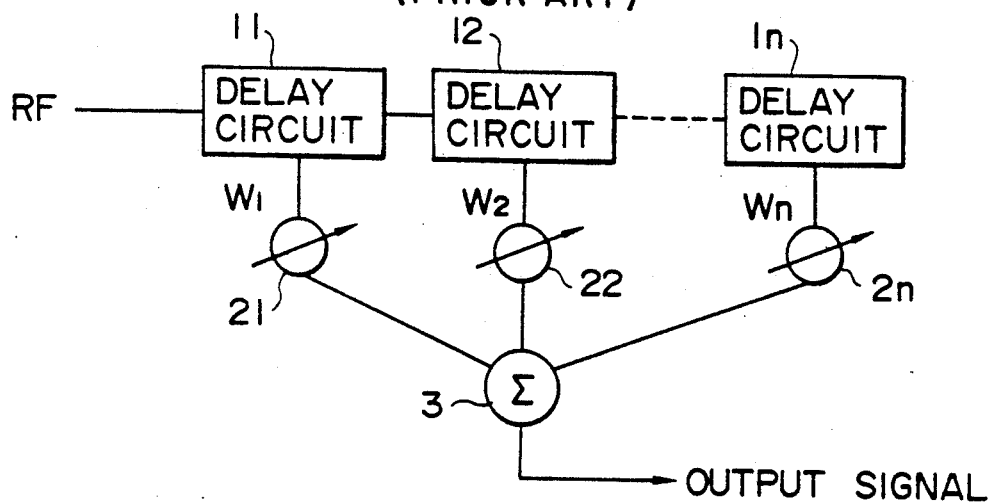
FIG. 20 is a view depicting a typical construction of the conventional linear filter.

It is conceivable that the conditions for driving the magnetic optical disk will vary. Such cases are addressed through experiments conducted using evaluation parameters different from those used in the learning process. Learning was performed with the recording density "d" set to 0.60 (μm/pit) and the laser power set to 8.1 (mw). FIGS. 17 and 18 show measurements taken when the recording density "d" was set to 0.56 or 0.60 and the laser power "d" to 8.1 or 7.3. It can be seen that in either case, separating "0" from "1" is not very difficult.

| Learning performed with recording density d = 6.0 (μm/pit) and laser power p = 8.1 (mw) | | | | |
|---|---|---|---|---|
| Recording density (μm/pit) | Laser power P (mw) | Mean M | Standard deviation σ | \|m/σ\| |
| 0.56 | 8.1 | −6.09 | 2.21 | 2.76 |
| | | 6.26 | 1.39 | 4.50 |
| 0.60 | 7.3 | −7.30 | 1.21 | 6.03 |
| | | 5.32 | 1.42 | 3.75 |

Table 3 shows the mean values "m" and the ratios thereof to standard deviations "σ" in the above cases. In Table 3, as in Table 2, the upper-tier values correspond to "0" data and the lower-tier values to "1" data.

As described, the signal reproducing apparatus according to the first aspect of the invention reproduces signals using a neural network arrangement. This makes it possible to ensure precise reading of signals from the recording medium and to chance the recording density thereon.

Also as described, the signal reproducing method according to the second aspect of the invention performs learning using the sigmoid function and carries out signal reproduction using the step function. This makes it possible precisely to set the coefficients involved and to simplify the construction of the signal reproducing apparatus on which the method is implemented.

As many apparently different embodiments of this invention may be made without departing from the spirit and scope thereof, it is to be understood that the invention is not limited to the specific embodiments thereof except as defined in the appended claims.

What is claimed is:

1. A signal reproducing apparatus for reproducing signals from a recording medium, said apparatus comprising:

analog-to-digital converting means for converting from analog to digital format the signals reproduced from said recording medium; and decoding means made of a neural network having learned coefficients beforehand for decoding signals output by said analog-to-digital converting means.

2. A signal reproducing apparatus according to claim 1, wherein said signal reproducing apparatus is a magnetic optical disk reproduction unit.

3. A signal reproducing apparatus according to claim 2, further comprising:

a circuit for irradiating a laser beam to pits recorded on said magnetic optical disk in order to reproduce RF signals therefrom, said reproduced RF signals being supplied by said circuit to said analog-to-digital converting means;

said neural network being composed of units constituting an input layer, a hidden layer and an output layer.

4. A signal reproducing apparatus according to claim 3, wherein said neural network has a coefficient generation circuit for setting beforehand coefficients to said units in accordance with a sigmoid function.

5. A signal reproducing method for reproducing signals from a recording medium, comprising a first step and a second step;

said first step having a neural network learn predetermined coefficients by use of a sigmoid function; and said second step decoding the signals reproduced from said recording medium by use of a step function through said neural network.

6. A signal reproducing method according to claim 5, said first step further comprising the steps of:

reproducing signals from appropriate pits formed beforehand on a disk medium;

inputting the reproduced signals to the units constituting said neural network;

inputting the signals output by said units to a coefficient generation circuit;

inputting a target value to said coefficient generation circuit;

performing a learning process based on said sigmoid function through the use of said target value and said output signals from said units; and establishing the coefficients obtained from said learning process as the coefficients in effect between said units.

* * * * *